United States Patent
Arrell et al.

(10) Patent No.: US 10,247,010 B2
(45) Date of Patent: Apr. 2, 2019

(54) TURBINE ENGINE COMPONENTS WITH NEAR SURFACE COOLING CHANNELS AND METHODS OF MAKING THE SAME

(71) Applicant: Siemens Energy, Inc., Orlando, FL (US)

(72) Inventors: Douglas J. Arrell, Oviedo, FL (US); Stefan Mazzola, Sanford, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1008 days.

(21) Appl. No.: 14/699,132

(22) Filed: Apr. 29, 2015

(65) Prior Publication Data

US 2015/0247410 A1 Sep. 3, 2015

Related U.S. Application Data

(62) Division of application No. 12/616,249, filed on Nov. 11, 2009, now abandoned.

(51) Int. Cl.
*F01D 5/18* (2006.01)
*F01D 5/14* (2006.01)
(Continued)

(52) U.S. Cl.
CPC .............. *F01D 5/187* (2013.01); *B23P 15/04* (2013.01); *F01D 5/147* (2013.01); *F01D 5/18* (2013.01); *F01D 9/02* (2013.01); *F01D 25/005* (2013.01); *F01D 25/12* (2013.01); *F05D 2230/60* (2013.01); *F05D 2230/90* (2013.01);
(Continued)

(58) Field of Classification Search
CPC .......... F01D 5/187; F01D 5/188; F01D 5/189; F01D 9/02; F01D 25/005; F01D 25/12; B23P 15/04; F05D 2300/5021; F05D 2300/50212; F05D 2230/60; F05D 2230/90; F05D 2240/12; Y10T 29/49321
USPC ....... 415/115; 416/96 A, 224, 229 A, 241 R, 416/241 B
See application file for complete search history.

(56) References Cited

U.S. PATENT DOCUMENTS 5,820,337 A * 10/1998 Jackson ................. C22C 32/00
   415/200
6,235,370 B1 * 5/2001 Merrill ..................... C23C 4/02
   29/888.025

(Continued)

FOREIGN PATENT DOCUMENTS

GB   803650 A * 10/1958 ............... B23P 15/04

*Primary Examiner* — Carlos A Rivera
*Assistant Examiner* — Jesse M Prager

(57) ABSTRACT

A turbine component includes an airfoil-shaped core having an outer peripheral surface. A plurality of channels is formed in the core, each opening to the outer peripheral surface. The channels extend substantially radially to be elongated in the radial direction. A first platform is attached to the core. The component also includes an airfoil-shaped non-permeable skin having a hollow interior, an inner peripheral surface and an outer peripheral surface. The skin is sized so that the core can be received in the hollow interior of the skin. A second platform is attached to the skin. The core is received in the hollow interior of the skin such that the outer peripheral surface of the core engages the inner peripheral surface of the skin such that a plurality of generally radial cooling channels are formed between the channels in the core and the inner peripheral surface of the skin.

7 Claims, 3 Drawing Sheets

(51) Int. Cl.
    *B23P 15/04*    (2006.01)
    *F01D 9/02*    (2006.01)
    *F01D 25/00*    (2006.01)
    *F01D 25/12*    (2006.01)

(52) U.S. Cl.
    CPC .... *F05D 2240/12* (2013.01); *F05D 2300/502* (2013.01); *F05D 2300/50212* (2013.01); *Y10T 29/49321* (2015.01); *Y10T 29/49341* (2015.01)

(56) References Cited

U.S. PATENT DOCUMENTS

| | | | |
|---|---|---|---|
| 7,670,116 B1* | 3/2010 | Wilson, Jr. | F01D 5/147 416/226 |
| 7,905,706 B1* | 3/2011 | Liang | F01D 5/14 415/115 |
| 8,303,253 B1* | 11/2012 | Liang | F01D 5/189 415/115 |
| 2010/0003128 A1* | 1/2010 | Chila | F01D 9/023 415/182.1 |

\* cited by examiner

TURBINE ENGINE COMPONENTS WITH NEAR SURFACE COOLING CHANNELS AND METHODS OF MAKING THE SAME

CROSS REFERENCE TO RELATED APPLICATIONS

This application is a divisional application of the U.S. patent application Ser. No. 12/616,249, filed Nov. 11, 2009, which is incorporated by reference herein in its entirety.

STATEMENT REGARDING FEDERALLY SPONSORED DEVELOPMENT

Development for this invention was supported in part by Contract No. DE-FC26-05NT42646 awarded by the United States Department of Energy. Accordingly, the United States Government may have certain rights in this invention.

FIELD OF THE INVENTION

The invention relates to turbine engines and, more particularly, to hot gas path components in the turbine and/or combustor sections of a turbine engine.

BACKGROUND OF THE INVENTION

During engine operation, high temperature, high velocity gases flow through the turbine section, passing rows of stationary vanes alternating with rows of rotating blades. Prior turbine vanes have been formed with an airfoil and platforms as a unitary construction, such as by casting. Such unitary constructions can result in lower manufacturing yields. Further, such vanes are typically made of only a single material. However, experience has demonstrated that no single material is ideal for every portion of the vane. In addition, the relatively large size of the past vane constructions made the use of certain materials infeasible.

The vanes must be cooled in order to withstand the high temperature turbine environment. However, in some of the prior vane constructions, manufacturing capabilities and other considerations rendered a number of cooling features and systems infeasible or otherwise not possible. Examples of desired cooling features include cooling channels near the outer surface of the airfoil and thin outer walls. These features can greatly enhance cooling, but have been difficult to achieve in prior vane constructions.

SUMMARY OF THE INVENTION

In one respect, embodiments of the invention are directed to a turbine component. The component includes a core that has an outer peripheral surface. The core has an airfoil shape. A plurality of channels is formed in the core such that each channel opens to the outer peripheral surface of the core. The channels extend substantially radially so as to be elongated in the radial direction. The core can have an associated radial length. Each of the channels can extend more than about 50 percent of the radial length of the core. A first platform is attached to the core. The first platform can be unitary with the core.

The component further includes a non-permeable skin with a hollow interior. The skin is airfoil-shaped and has an inner peripheral surface and an outer peripheral surface. The skin is sized so that the core is received in the hollow interior of the skin. A second platform is attached to the skin. The second platform can be unitary with the skin.

The core is received in the hollow interior of the skin such that the outer peripheral surface of the core engages the inner peripheral surface of the skin. As a result, a plurality of generally radial cooling channels is formed between the channels in the core and the inner peripheral surface of the skin. The skin is attached to the core over at least a portion of the engaging surfaces of the outer peripheral surface of the core and the inner peripheral surface of the skin.

The core can include one or more transverse channel that extend in a direction that is generally transverse to the radially extending channels. Such transverse channels can connect between two neighboring radially extending channels. In this way, there can be fluid communication between the two neighboring radially extending channels.

The core can be made of a material that has a higher coefficient of thermal expansion than the material of the skin. The outer peripheral surface of the core can substantially matingly engage the inner peripheral surface of the skin.

The skin can have a distal end, which can engage the first platform. In one embodiment, the distal end of the skin can be attached to the first platform.

In another respect, embodiments according to aspects of the invention relate to a method of forming a turbine component. An airfoil-shaped core having an outer peripheral surface is formed. A plurality of channels is formed in the core such that each channel opens to the outer peripheral surface of the core. The channels extend substantially radially so as to be elongated in the radial direction of the core.

A non-permeable, airfoil-shaped skin that has a hollow interior is formed. The skin has an inner peripheral surface and an outer peripheral surface. The skin is sized so that the core can be received in the hollow interior of the skin.

The core and the skin are brought together such that the core is received in the hollow interior of the skin such that the outer peripheral surface of the core engages the inner peripheral surface of the skin. As a result, a plurality of generally radial cooling channels is formed between the channels in the core and the inner peripheral surface of the skin. The skin is attached to the core over at least a portion of those surfaces of the outer peripheral surface of the core and the inner peripheral surface of the skin that engage each other.

The skin can include a distal end. After the core and the skin together are brought together, the distal end of the skin can engage the first platform. In such case, the method can further include the step of attaching the distal end of the skin to the first platform.

The method can further include the step of forming a first platform together with the core so as to form a unitary structure. In addition, the method can include the step of forming a second platform together with the skin such that a unitary structure is formed.

DETAILED DESCRIPTION OF EMBODIMENTS OF THE INVENTION

Embodiments of the invention are directed to constructions of turbine engine components that can allow the use of different materials and/or that can provide cooling to the outer wall of the components. Aspects of the invention will be explained in connection with a turbine vane, but the detailed description is intended only as exemplary. Indeed, aspects of the invention can be applied to other turbine engine components, such as turbine blades, ring seal segments and transition ducts. Embodiments of the invention are shown in FIGS. 1-6, but the present invention is not limited to the illustrated structure or application.

Figure 1:
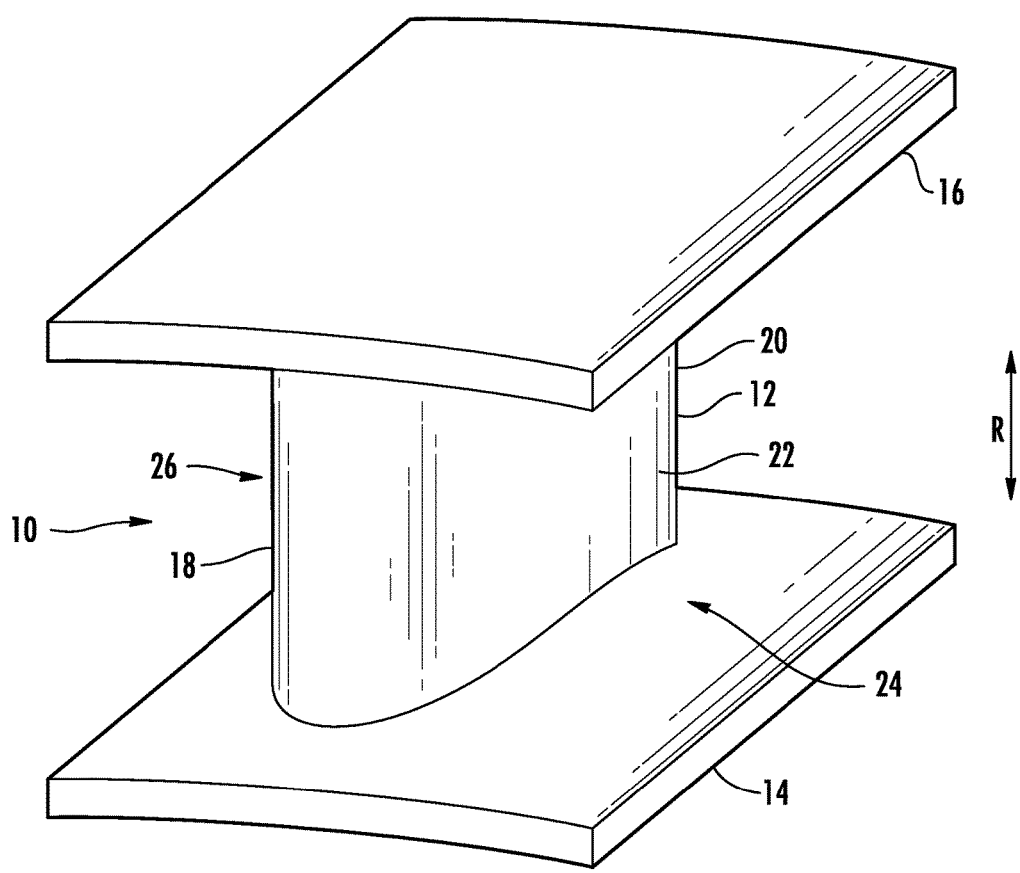
FIG. 1 is a perspective view of a vane according to aspects of the invention.

FIG. 1 generally shows a turbine vane 10 according to aspects of the invention. The turbine vane 10 includes an airfoil 12, an inner platform 14 and an outer platform 16. The terms "radial," "inner," "outer," "upper," and "lower" and variations of these terms, as used herein, are intended to mean relative to the turbine axis when the turbine vane assembly is installed in its operational position. The radial direction R is shown in FIG. 1, and it generally extends in the direction of elongation of the airfoil 12.

At least one of the platforms 14, 16 can be formed with the airfoil 12 as a unitary construction. Alternatively, at least one of the platforms 14, 16 can be formed separately from the airfoil 12 and subsequently joined together. One example of such a construction is disclosed in U.S. Pat. No. 7,452,182, which is incorporated herein by reference. The airfoil 12 can have a leading edge 18, a trailing edge 20, an outer peripheral surface 22, a pressure side 24 and a suction side 26.

Figure 2:
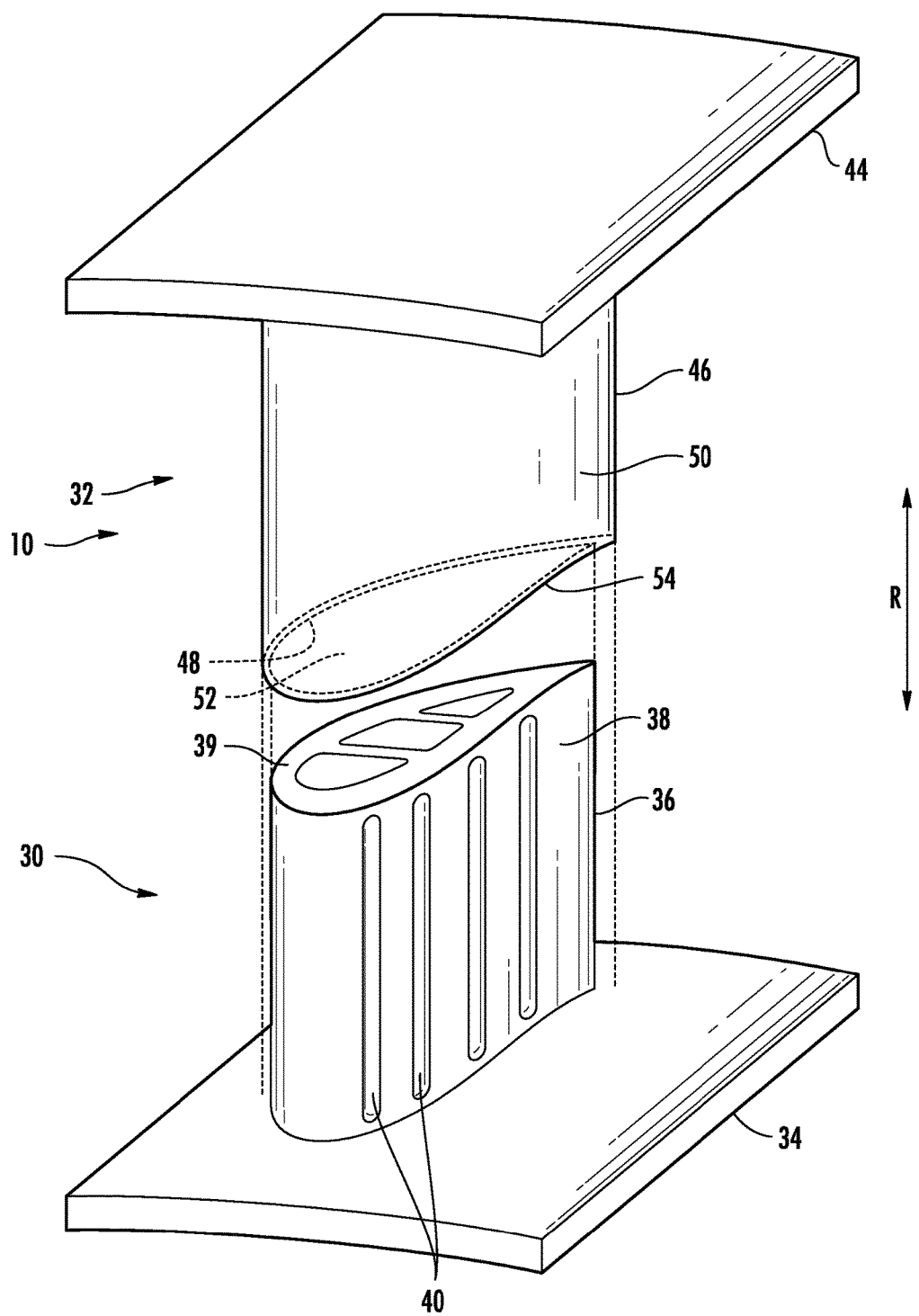
FIG. 2 is an exploded perspective view of an airfoil configured in accordance with a first embodiment of the invention.
Figure 3:
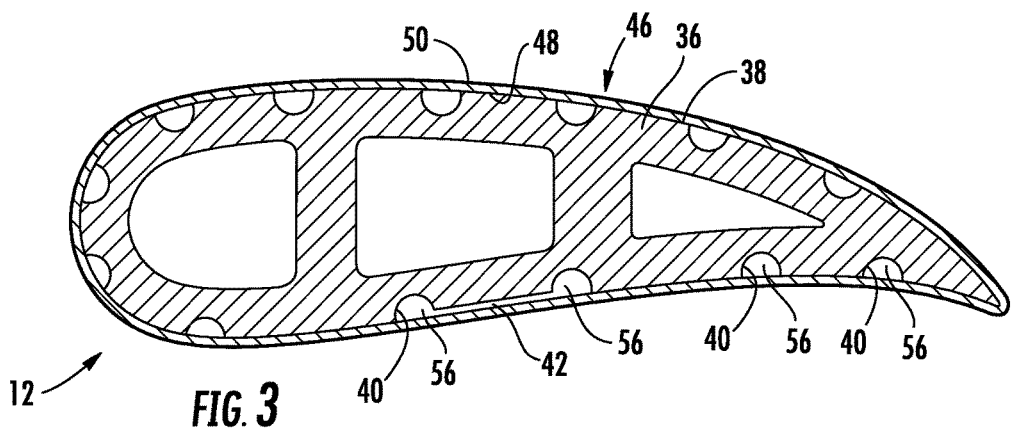
FIG. 3 is a cross-sectional view of an airfoil configured in accordance with a first embodiment of the invention.

Referring to FIGS. 2 and 3, a first embodiment of a turbine vane 10 configured in accordance with aspects of the invention is shown. The 10 vane includes a first portion 30 and a second portion 32.

The first portion 30 can include a platform 34 and a core 36. The platform 34 and the core 36 can be formed as a single piece, such as by casting, machining or combinations thereof. Alternatively, the platform 34 can be formed separately from the core 36, and the two pieces 34, 36 can be subsequently joined, as noted above. The platform 34 and/or the core 36 can be made of any suitable material, such as a high temperature capable material, including, for example, nickel-, iron- or cobalt-based superalloys as well as ceramic matrix composites. The platform 34 can have any suitable configuration. The platform 34 may ultimately form either the inner platform 14 or the outer platform 16 of the vane 10.

The core 36 can be airfoil-shaped. The core 36 can be a substantially solid body or at least a portion of the core 36 can be hollow or include one or more cooling passages (not shown). The core 36 can include an outer peripheral surface 38 and can have a distal end 39. A plurality of channels 40 can be formed in the core 36 such that each of the channels 40 opens to the outer peripheral surface 38 of the core 36. The channels 40 can extend substantially radially so as to be elongated in the radial direction R. In one embodiment, the channels 40 can extend more than 50% of the radial length of the core 36.

The channels 40 can be substantially straight. In one embodiment, at least one of the channels 40 may be non-straight. The channels 40 can be generally parallel to each other, or at least one of the channels 40 can be non-parallel to the other channels 40. The channels 40 can be formed in any suitable manner, such as by casting or machining or combinations thereof, just to name a few possibilities.

The channels 40 can have any suitable cross-sectional shape. For instance, the channels 40 can have a generally semi-circular, semi-oval, parabolic, rectangular, polygonal, trapezoidal, or triangular cross-sectional shape, just to name a few possibilities. The cross-section size of the channels 40 can be substantially constant along their length, or the cross-sectional size of the channels 40 can vary along at least a portion of their length.

The plurality of channels 40 can be identical to each other. Alternatively, at least one of the channels 40 can be different from the other channels in one or more respects, including, for example, in size, shape, length and/or width. The channels 40 can be distributed about at least a portion of the outer peripheral surface 38 of the core 36. In one embodiment, the channels 40 can be distributed about the entire outer peripheral surface 38 of the core 36. The channels 40 can be substantially equally spaced about the outer peripheral surface 38 of the core 36, or at least one of the channels 40 can have a different spacing from the other channels 40.

In some instances, the channels 40 can be completely separate from each other. In other instances, two or more neighboring channels 40 can be connected to each other by one or more channels 42 that extend generally transverse to the radial direction R, as is shown in FIG. 3. The above discussion of the plurality of channels 40 can apply equally to the transverse channels 42.

The second portion 32 can include a platform 44 and a skin 46. The platform 44 and the skin 46 can be formed as a single piece, such as by casting or machining or combinations thereof. Alternatively, the platform 44 can be formed separately from the skin 46, and the two pieces 44, 46 can be subsequently joined, as noted above. The platform 44 and/or the skin 46 can be made of any suitable material, such as a high temperature capable material, including, for example, nickel-, iron- or cobalt-based superalloys as well as ceramic matrix composites. In one embodiment, the material of the core 36 can have a higher coefficient of thermal expansion than the material of the skin 46. The skin 46 can be made of a single layer of material. Further, the skin 46 can be non-porous and/or non-permeable.

The platform 44 can have any suitable configuration. The platform 44 may ultimately form either the inner platform 14 or the outer platform 16 of the vane 10. While the FIG. 2 shows the inner platform 14 as being formed with the core 36 and the outer platform 16 formed with the skin 46, it will be appreciated that the opposite arrangement can be provided. That is, the inner platform 14 can be formed with the skin 46 and the outer platform 16 can be formed with the core 36.

The skin 46 can be airfoil-shaped. The skin 46 can have an inner peripheral surface 48 and an outer peripheral surface 50. The skin 46 can have a hollow interior 52. The skin 46 can have a distal end 54. The skin 46 can be sized so that the core 36 can be received in the hollow interior 52 of the skin 46. The skin 46 can have an associated thickness 46T. In one embodiment, the thickness 46T of the skin 46 can be at least about 1 millimeter. However, the skin 46 can have any suitable thickness 46T depending on the requirements for the application at hand.

The vane 10 can be formed by bringing the first and second portions 30, 32 together so that the core 36 is received in the skin 46. The outer peripheral surface 38 of the core 36 can engage the inner peripheral surface 48 of the skin 46. More particularly, the outer peripheral surface 38 of the core 36 can substantially matingly engage the inner peripheral surface 48 of the skin 46.

The skin 46 can be attached to the core 36 in any suitable manner, including, for example, by bonding, brazing, diffusion bonding, adhesives, fasteners and/or mechanical engagement. Such attachment can occur over at least a portion of the engaging surfaces of the outer peripheral surface 38 of the core 36 and the inner peripheral surface 48 of the skin 46. There may be some areas where such joining of the core 36 and skin 46 may not be provided, such as at or near the trailing edge 20 of the airfoil 12.

The distal end 54 of the skin 46 can engage the platform 34 of the first portion 30. The distal end 54 and the platform 34 of the first portion 34 can be sealingly connected in any suitable manner, such as by bonding, brazing, diffusion bonding, adhesives, fasteners and/or mechanical engagement. The distal end 39 of the core 36 can engage at least a portion of the platform 44 of the second portion 32.

It will be appreciated that a plurality of generally radial cooling channels 56 can be formed between the channels 40 in the core 36 and the inner peripheral surface 48 of the skin 46, as is shown in FIG. 3. The cooling channels 40 can be separate from each other. Alternatively, if one or more transverse channels 42 are provided, then two or more of the radial cooling channels 40 can be in fluid communication with each other. During engine operation, any suitable coolant can be supplied to the cooling channels 56 in any manner. For instance, the coolant can be delivered to the cooling channels 56 through one or more of the platforms 34, 44 or through the core 36. The coolant can be exhaust from the vane 10 in any suitable manner.

Figure 4:
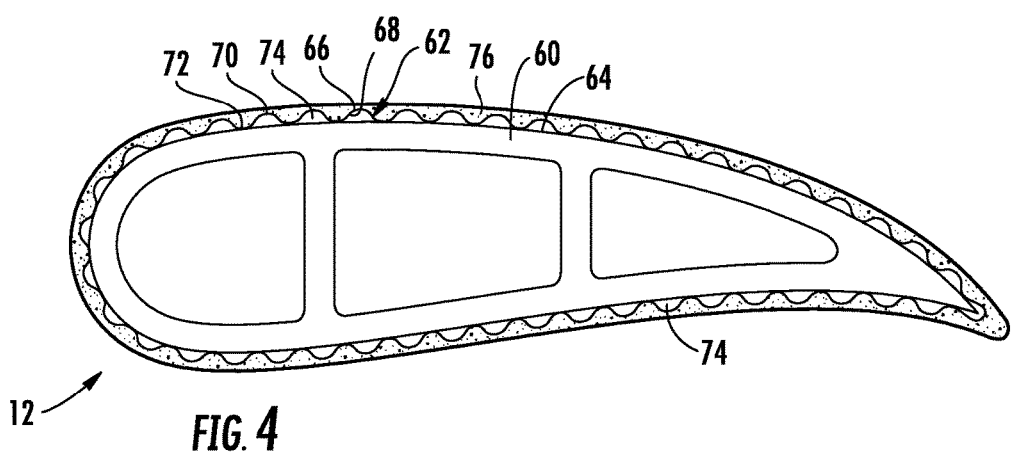
FIG. 4 is a cross-sectional view of an airfoil configured in accordance with a second embodiment of the invention.
Figure 5:
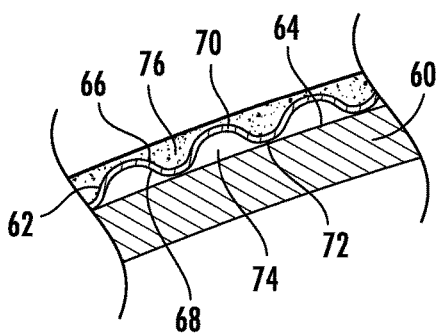
FIG. 5 is a cross-sectional view of a portion of the airfoil configured in accordance with a second embodiment of the invention, showing a wavy skin coated with a thermal insulating material.

Referring to FIGS. 4 and 5, a second embodiment of a turbine vane 10 configured in accordance with aspects of the invention is shown. The vane 10 includes a core 60 and a skin 62.

The core 60 can be generally airfoil-shaped. The core 60 can be made of any suitable material, including for example, superalloys. The core 60 can be a generally solid structure, or it can be hollow. The core 60 can have any suitable number of passages (not shown) therein. The core 60 can have an outer peripheral surface 64.

According to aspects of the invention, the skin 62 can be made of any suitable material. For instance, the skin 62 can be made of a sheet of oxide dispersion strengthened alloy or similar high temperature material. The skin 62 can be provided about at least a portion of the outer peripheral surface 64 of the core 60. The skin 62 can have any suitable thickness, preferably one that is relatively thin and able to withstand the aerodynamic loads during engine operation. The skin 62 can have an outer side 66 and an inner side 68 relative to the core 60.

The skin 62 can be configured so that it generally has a wavy cross-sectional profile. The term "wavy" means any wave-like or undulating formation in the skin 62 such that the skin 62 has a plurality of peaks 70 and valleys 72. The wave shape can be generally sinusoidal, square, triangular or sawtooth, just to name a few possibilities. The wave shape can be a regular or irregular waveform. The wave shape can be periodic over at least a portion of its length. The skin 62 according to embodiments of the invention is not limited to any particular type of wave. In one embodiment, the wave shape of the skin 62 can be substantially identical about the core 60. In one embodiment, one or more of the individual waves can be different from the others waves in terms of size, shape, width, height and/or length, just to name a few possibilities. The individual waves of the skin 62 can extend in the radial direction R. The wave shape of the skin 62 can be achieved in any suitable way. For instance, the skin 62 can be made of a sheet of material that is stamped, worked or formed into the desired wave shape.

The skin 62 can engage the outer peripheral surface 64 of the core 60 such that the valleys 72 of the skin 62 substantially abut the outer peripheral surface 64 of the core 60. The term "substantially abut" includes actual abutment of the skin 62 and the outer peripheral surface 64 of the core 60 as well as a minimal spacing therebetween. The skin 62 can be attached to the outer peripheral surface 64 of the core 60 in any suitable manner. For instance, the skin 62 can be attached to the core 60 by welding, brazing, bonding, adhesives, mechanical engagement, or combinations thereof, just to name a few possibilities. Such attachment can be continuous in the radial direction R along the interface between each valley 72 and the outer peripheral surface 64 of the core 60. Alternatively, the attachment may be intermittent in the radial direction R.

Once the skin 62 is attached to the core 60, a plurality of cooling channels 74 can be formed in the space between the outer peripheral surface 64 of the core 60 and each wave of the skin 62, that is, the portion of the skin 62 between two neighboring valleys 72. The cooling channels 74 can be elongated in the radial direction R. The cooling channels 74 can be substantially straight.

In some instances, the cooling channels 74 can be isolated from each other. In other instances, there can be fluid communication between two neighboring cooling channels 74. Such fluid communication can be achieved in various ways, such as when the skin 62 is intermittently attached to the core 60 in the radial direction R. In such case, a leakage path can be formed between two neighboring cooling channels 74.

During engine operation, any suitable coolant can be supplied to the cooling channels 74 in any suitable manner. For instance, the coolant can be delivered to the cooling channels 74 through one or more of the platforms 14, 16 or through the core 60. The coolant can be exhaust from the vane 10 in any suitable manner.

Figure 6:
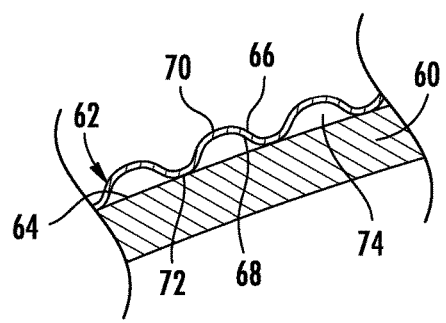
FIG. 6 is a cross-sectional view of a portion of the airfoil configured in accordance with a second embodiment of the invention, showing an uncoated wavy skin.

In some instances, the skin 62 can be uncoated so that the outer side 66 of the skin 62 forms at least a portion of the outer peripheral surface 22 of the airfoil 12, as is shown in FIG. 6. In other instances, the outer side 66 of the skin 62 can be coated with a thermal barrier coating or thermal insulating material 76. Such a configuration is shown in FIG. 6. In such case, the thermal insulating material 76 can form at least a portion of the outer peripheral surface 22 of the airfoil 12. The thermal insulating material 76 can be friable graded insulation (FGI) 37. Examples of FGI are disclosed in U.S. Pat. Nos. 6,676,783; 6,641,907; 6,287,511; and 6,013,592, which are incorporated herein by reference.

A vane configured as described above can provide numerous advantages over prior vane constructions. For instance, due to the smaller sizes of the individual components of the vane assembly, the manufacturing of these components is less complicated, which allows for improved manufacturing yields. The modular design allows for the use of dissimilar materials in the vane as opposed to a single material. These different materials can be selectively employed in areas where needed. A modular vane according to aspects of the invention can facilitate the selective implementation of suitable materials to optimize component life, cooling air usage, aerodynamic performance, and cost. In addition, because the vane is made of several smaller subcomponents, desirable materials, which were rendered infeasible in a large unitary vane construction, may be available for use in some of the subcomponents.

Moreover, the airfoil construction according to aspects of the invention can allow greater flexibility in the size and shape of the cooling channels. In addition, the construction allows for the inclusion of more complicated cooling channels and thinner outer walls than would be otherwise available under conventional vane construction techniques. The vane construction can facilitate near wall cooling of a relatively thin outer wall or surface.

The foregoing description is provided in the context of one possible application for the system according to aspects of the invention. While the above description is made in the context of a turbine vane, it will be understood that the system according to aspects of the invention can be applied to other turbine engine components, such as turbine blades, ring seal segments and transition ducts. Thus, it will of course be understood that the invention is not limited to the specific details described herein, which are given by way of example only, and that various modifications and alterations are possible within the scope of the invention as defined in the following claims.

What is claimed is:

1. A method of forming a turbine component comprising the steps of:
    forming an airfoil-shaped core having an outer peripheral surface;
    forming a plurality of channels in the core such that each channel opens to the outer peripheral surface of the core, the plurality of channels extending radially so as to be elongated in the radial direction;
    forming a non-permeable, airfoil-shaped skin having a hollow interior, the skin having an inner peripheral surface and an outer peripheral surface, the skin being sized so that the core can be received in the hollow interior of the skin;
    after the step of forming the plurality of channels in the core, bringing the core and the skin together such that the core is received in the hollow interior of the skin such that the outer peripheral surface of the core engages the inner peripheral surface of the skin to thereby form a plurality of radial cooling channels between the channels in the core and the inner peripheral surface of the skin; and
    attaching the skin to the core over at least a portion of the engaging surfaces of the outer peripheral surface of the core and the inner peripheral surface of the skin,
    wherein the method further includes:
        forming a first platform together with the core, whereby a unitary structure is formed; and
        forming a second platform together with the skin, whereby a unitary structure is formed.

2. The method of claim 1 wherein the skin includes a distal end and wherein, after the step of bringing the core and the skin together, the distal end of the skin engages the first platform, and further including the step of:
    attaching the distal end of the skin to the first platform.

3. The method of claim 1, wherein the core is formed such that it includes at least one transverse channel extending in a direction that is transverse to the radially extending channels, the at least one transverse channel connects between two neighboring radially extending channels.

4. The method of claim 1, wherein the core is made of a material that has a higher coefficient of thermal expansion than the material of the skin.

5. The method of claim 1, including matingly engaging the outer peripheral surface of the core with the inner peripheral surface of the skin.

6. The method of claim 1, wherein the core has an associated radial length, wherein each of the channels extends more than 50 percent of the radial length of the core.

7. The method of claim 1, wherein the turbine component is a vane.

* * * * *